D. Skidmore,

Knob Attachment.

No. 2,473. Reissued Feb. 5, 1867.

Witnesses.
R. F. Osgood
D. C. Johnson

Inventor.
Darius Skidmore
by J. Fraser, Hee Attys

N. PETERS, PHOTO-LITHOGRAPHER, WASHINGTON, D. C.

United States Patent Office.

DARIUS SKIDMORE, OF SENECA FALLS, NEW YORK.

*Letters Patent No.* 35,899, *dated July* 15, 1862; *reissue No.* 2,473, *dated February* 5, 1867.

IMPROVED MODE OF FASTENING DOOR KNOBS TO THEIR SPINDLES.

The Schedule referred to in these Letters Patent and making part of the same.

TO ALL WHOM IT MAY CONCERN:

Be it known that I, DARIUS SKIDMORE, of Seneca Falls, in the county of Seneca, and State of New York, did invent a new and useful Improvement in Fastening the Shanks of Door Knobs, for which Letters Patent of the United States were granted on July 15, 1862; and I do hereby declare that the following is a full and exact description thereof, reference being made to the accompanying drawings, making part of this specification.

Figure 1:
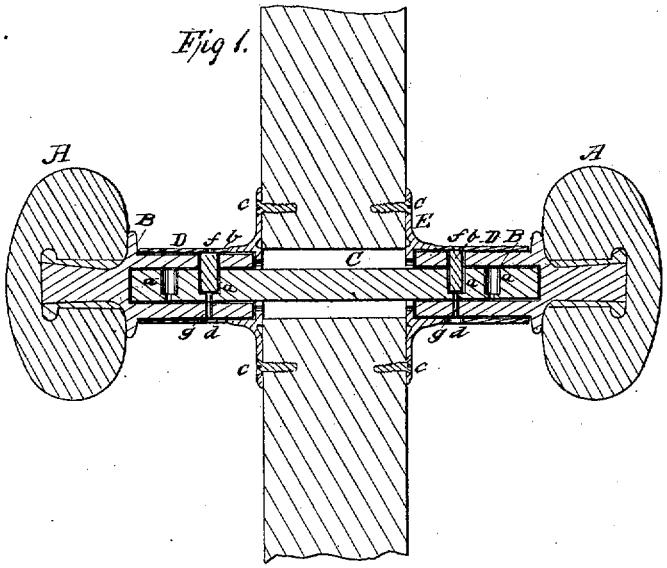

Figure 1 is a central longitudinal section of a door knob arranged in my improved manner and applied to a door.

Figure 2:
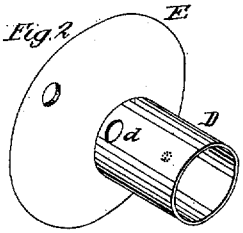

Figure 2, a perspective view of the socket or sleeve and the rose or flange.

Figure 3:
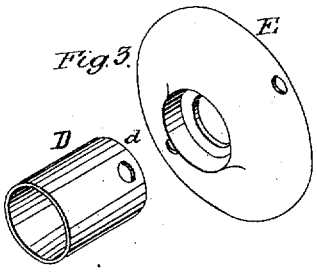

Figure 3, a view similar to fig. 2, but showing a modification.

Like letters of reference indicate corresponding parts in all the figures.

The usual way of fastening the shank of the knob to the spindle that passes through the door and operates the bolt, is by a small screw that passes in through both to couple them together. By the continual and violent action of the door knob, in turning, the screw frequently becomes loose, climbing up, as it were, by its threads, from the socket in which it rests, and falls out. This difficulty is aggravated by the position of the screw, which is always angular in the shank. It is the object of my invention to obviate this difficulty by securing the shank and spindle together in such a manner that they can never become uncoupled by accident.

As represented in the drawings, the general construction of the door knob is as usual, consisting of hand knobs, A A, secured to shanks, B B, which are coupled to the spindle C, that passes through the door and operates the bolt. The usual holes, *a a*, are made in an upright position in the spindle and shank, which, when coincident, receives the coupling device. This device, instead of being in the form of a screw, as usual, is simply a plain, smooth pin, *b*, which is dropped into the holes, and retains its place simply by its own gravity, its upright position, as shown in the drawings, being such that it cannot fall out. The advantage of this plain pin over the ordinary screw coupling is so obvious that reference thereto is hardly necessary. The screw is constantly working out under violent turning action, climbing up, as it were, more and more at each turn, upon its threads, till it finally falls out. There can be no such working out of place in the employment of the plain pin, since it has no threads on which to rest, but constantly retains its place by reason of its own gravity. Over the shank B fits the rose or flange E, secured to the door by screws in the usual manner. In figs. 1 and 2 the rose is shown with a socket or sleeve, D, projecting outward sufficiently to cover the top of the coupling pin. In fig. 3 the socket or sleeve is shown as made separate and independent of the rose, and resting simply on the shank. This is simply an equivalent of the form at first described; and in fact any form of the rose that will cover the pin may be employed. The socket or sleeve D has a hole, *d*, corresponding in position with the coupling pin. When the pin is to be applied, the hole *d* is brought in coincidence with hole *a*, when the pin is dropped in place, and the sleeve is turned around sufficiently to remove *d* from *a*, as shown. Thus arranged, the coupling pin is always securely held in position, and can be removed only by design. In storage and transportation, before the knob is secured to the door, this socket or sleeve will always hold the pin in place, even if it should become inverted. Thus the articles can be securely packed. By avoiding the use of the screw by the substitution of the plain pin, there will be no grinding of the head of the coupling against the inner periphery of the socket of the sleeve.

What I claim as my invention, and desire to secure by Letters Patent, is—

Covering or enclosing the end of the coupling pin of the knob, shank, and spindle, wholly or partially, by the socket or eye of the rose, substantially as and for the purpose herein specified.

I also claim a smooth coupling pin, *b*, retained in its hole by its gravity, in combination with the covering thereof by the socket or sleeve of the rose, substantially as herein set forth.

DARIUS SKIDMORE.

Witnesses:

JOHN KNOX,

W. H. HOOD.